(12) United States Patent
Li et al.

(10) Patent No.: US 10,983,215 B2
(45) Date of Patent: Apr. 20, 2021

(54) TRACKING OBJECTS IN LIDAR POINT CLOUDS WITH ENHANCED TEMPLATE MATCHING

(71) Applicants: Dalong Li, Troy, MI (US); Alex M Smith, LaSalle (CA); Stephen Horton, Rochester, MI (US)

(72) Inventors: Dalong Li, Troy, MI (US); Alex M Smith, LaSalle (CA); Stephen Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 328 days.

(21) Appl. No.: 16/224,978

(22) Filed: Dec. 19, 2018

(65) Prior Publication Data

US 2020/0200906 A1    Jun. 25, 2020

(51) Int. Cl.
| | |
|---|---|
| *G01S 17/66* | (2006.01) |
| *G01S 7/48* | (2006.01) |
| *B60W 30/09* | (2012.01) |
| *B60W 30/14* | (2006.01) |
| *G01S 17/931* | (2020.01) |

(52) U.S. Cl.
CPC ............. *G01S 17/66* (2013.01); *B60W 30/09* (2013.01); *B60W 30/14* (2013.01); *G01S 7/4802* (2013.01); *G01S 7/4808* (2013.01); *G01S 17/931* (2020.01); *B60W 2420/52* (2013.01)

(58) Field of Classification Search
CPC ...... G01S 17/66; G01S 17/931; G01S 7/4808; G01S 7/4802; G01S 17/89; B60W 30/09; B60W 30/14; B60W 2420/52; G06N 20/00
See application file for complete search history.

(56) References Cited

U.S. PATENT DOCUMENTS

| | | | |
|---|---|---|---|
| 2012/0082385 A1* | 4/2012 | Xu ...................... | G06K 9/6857 382/199 |
| 2015/0003741 A1* | 1/2015 | Zhang ................... | G06T 7/33 382/199 |
| 2015/0254499 A1* | 9/2015 | Pang ..................... | G06T 7/001 382/103 |

FOREIGN PATENT DOCUMENTS

| | | |
|---|---|---|
| CN | 103093459 B | 12/2015 |
| CN | 106997049 A | 8/2017 |

* cited by examiner

*Primary Examiner* — Thomas Ingram
(74) *Attorney, Agent, or Firm* — Ralph E. Smith

(57) ABSTRACT

An advanced driver assistance system (ADAS) and method for a vehicle utilize a light detection and ranging (LIDAR) system configured to emit laser light pulses and capture reflected laser light pulses collectively forming three-dimensional (3D) LIDAR point cloud data and a controller configured to receive the 3D LIDAR point cloud data, convert the 3D LIDAR point cloud data to a two-dimensional (2D) birdview projection, obtain a template image for object detection, the template image being representative of a specific object, blur the 2D birdview projection and the template image to obtain a blurred 2D birdview projection and a blurred template image, and detect the specific object by matching a portion of the blurred 2D birdview projection to the blurred template image.

18 Claims, 5 Drawing Sheets

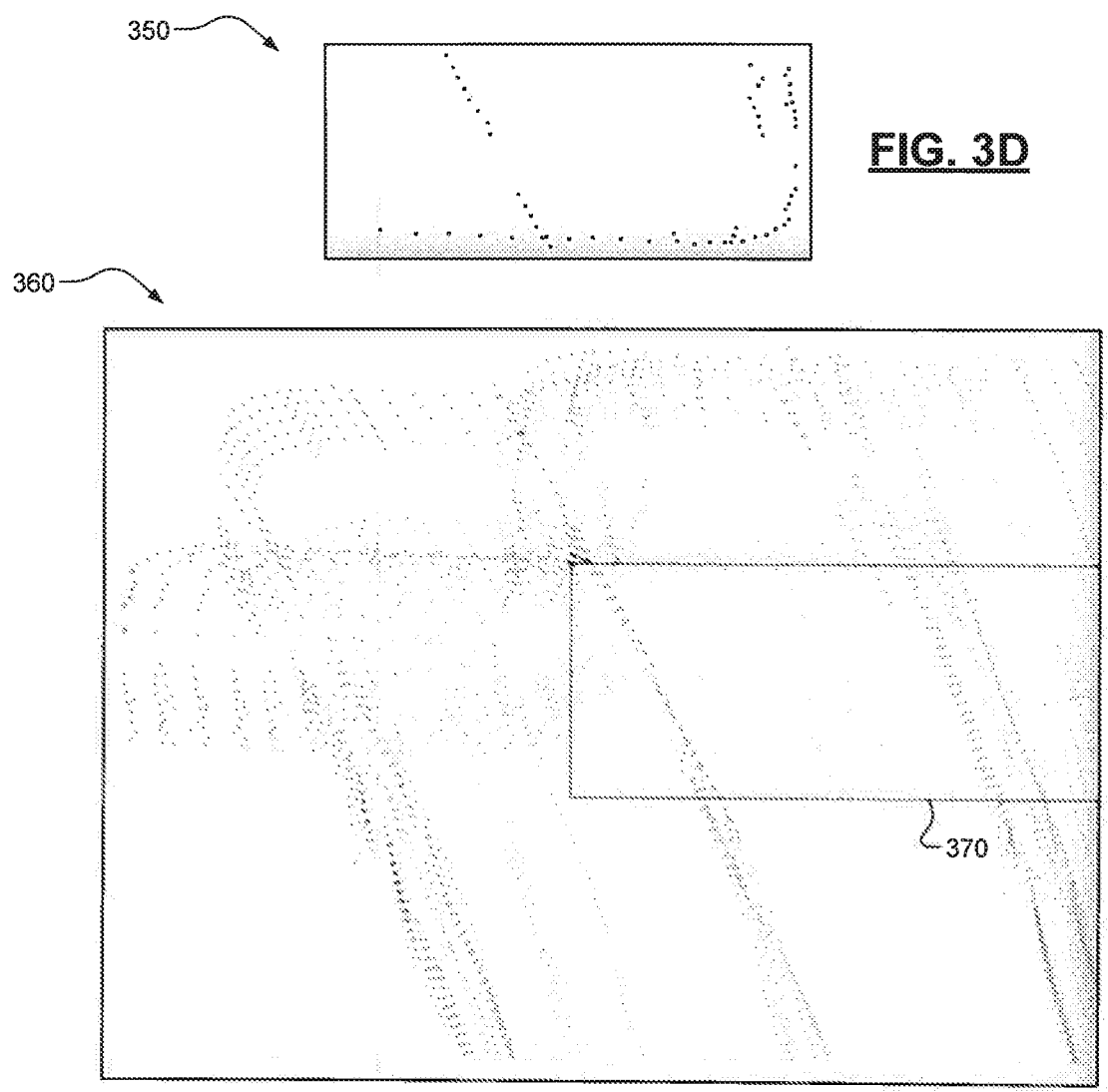
FIG. 3D
FIG. 3E
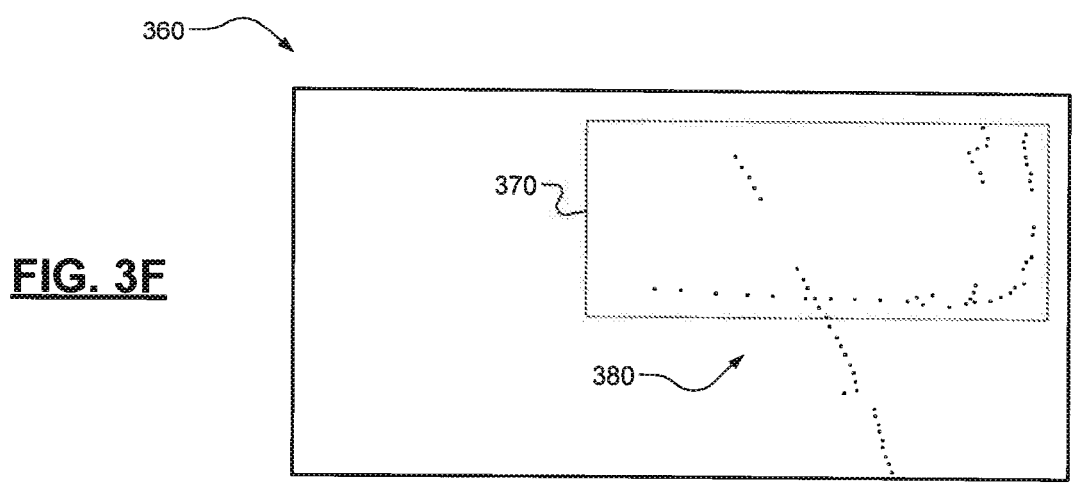
FIG. 3F

TRACKING OBJECTS IN LIDAR POINT CLOUDS WITH ENHANCED TEMPLATE MATCHING

FIELD

The present application generally relates to vehicle advanced driver assistance systems (ADAS) and, more particularly, to techniques for tracking objects in light detection and ranging (LIDAR) point clouds with enhanced template matching.

BACKGROUND

Some vehicle advanced driver assistance systems (ADAS) utilize light detection and ranging (LIDAR) systems to capture information. LIDAR systems emit laser light pulses and capture pulses that are reflected back by surrounding objects. By analyzing the return times and wavelengths of the reflected pulses, three-dimensional (3D) LIDAR point clouds are obtained. Each point cloud comprises a plurality of reflected pulses in a 3D (x/y/z) coordinate system). These point clouds could be used to detect objects (other vehicles, pedestrians, traffic signs, etc.). It is typically difficult, however, to distinguish between different types of objects without using extensively trained deep neural networks (DNNs). This requires a substantial amount of labeled training data (e.g., manually annotated point clouds) and also substantial processing power, which increases costs and decreases vehicle efficiency. Accordingly, while such ADAS systems do work well for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a light detection and ranging (LIDAR) system configured to emit laser light pulses and capture reflected laser light pulses collectively forming three-dimensional (3D) LIDAR point cloud data and a controller configured to: receive the 3D LIDAR point cloud data, convert the 3D LIDAR point cloud data to a two-dimensional (2D) birdview projection, obtain a template image for object detection, the template image being representative of a specific object, blur the 2D birdview projection and the template image to obtain a blurred 2D birdview projection and a blurred template image, and detect the specific object by matching a portion of the blurred 2D birdview projection and the blurred template image.

In some implementations, the controller is configured to blur the 2D birdview projection and the template image by applying an averaging filter. In some implementations, the blurred 2D birdview projection and the blurred template image each have less resolution than the corresponding 2D birdview projection and template image. In some implementations, the averaging filter is a moving average filter. In some implementations, the averaging filter is an image box blur filter.

In some implementations, the controller is further configured to identify a search area in the 2D birdview projection that corresponds to the portion of the blurred 2D birdview projection used for matching.

In some implementations, the template image is a 2D birdview projection of 3D LIDAR point cloud template data, and wherein the controller is further configured to retrieve the template image from a memory.

In some implementations, the controller is further configured to track the detected object and control an ADAS function of the vehicle based on the tracking.

In some implementations, the controller does not utilize a deep neural network (DNN) and machine learning.

According to another example aspect of the invention, an object detection and tracking method for a vehicle is presented. In one exemplary implementation, the method comprises: receiving, by a controller of the vehicle and from a LIDAR system of the vehicle, 3D LIDAR point cloud data indicative of reflected laser light pulses captured by the LIDAR system after emitting of laser light pulses by the LIDAR system, converting, by the controller, the 3D LIDAR point cloud data to a 2D birdview projection, obtaining, by the controller, a template image for object detection, the template image being representative of an object, blurring, by the controller, the 2D birdview projection and the template image to obtain a blurred 2D birdview projection and a blurred template image, and detecting, by the controller, the object by matching a portion of the blurred 2D birdview projection and the blurred template image.

In some implementations, the blurring of the 2D birdview projection and the template image comprises applying an averaging filter. In some implementations, the blurred 2D birdview projection and the blurred template image each have less resolution than the corresponding 2D birdview projection and template image. In some implementations, the averaging filter is a moving average filter. In some implementations, the averaging filter is an image box blur filter.

In some implementations, the method further comprises identifying, by the controller, a search area in the 2D birdview projection that corresponds to the portion of the blurred 2D birdview projection used for matching.

In some implementations, the template image is a 2D birdview projection of 3D LIDAR point cloud template data, and further comprising retrieving, by the controller and from a memory, the template image.

In some implementations, the method further comprises tracking, by the controller, the detected object and controlling, by the controller, an ADAS function of the vehicle based on the tracking.

In some implementations, the controller does not utilize a DNN and machine learning.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 3A-3F are example blurred and non-blurred 2D template images and two-dimensional (2D) birdview projections illustrating the enhanced template matching techniques according to some implementations of the present disclosure.

DETAILED DESCRIPTION

As discussed above, there exists a need for improvement in automated driver assistance (ADAS) systems that utilize light detection and ranging (LIDAR) for object detection. It will be appreciated that the term "ADAS" as used herein includes driver assistance systems (lane keeping, adaptive cruise control, etc.) as well as partially and fully autonomous driving systems. A conventional ADAS for object detection utilizes a deep neural network (DNN) trained by machine learning with annotated (e.g., human labeled) training data. This requires a substantial amount of resources, both from a processing standpoint and a labeled training data standpoint, which increases costs and complexity. Accordingly, simplified techniques for object detection and tracking are presented. These techniques involve converting three-dimensional (3D) point cloud data to a two-dimensional (2D) birdview projection. The term "birdview" as used herein refers to a bird's-eye elevated view of the area surrounding a vehicle (e.g., with a perspective as though the observer was a bird).

At least a portion of this 2D birdview projection and templates are then blurred (e.g., using a moving average filter) and the blurred images are used for template matching to discern between different types of objects (vehicles, pedestrians, traffic signs, etc.). The blurring of images for object detection/recognition is counterintuitive because it decreases the resolution, which typically results in lower performance matching. For disperse point cloud data, however, the blurring of the template image and the point cloud data is actually beneficial because it softens features and allows for better matching performance. By converting to a 2D birdview projection, these techniques also require substantially less processing power and do not require a complex DNN and training data.

Figure 1:
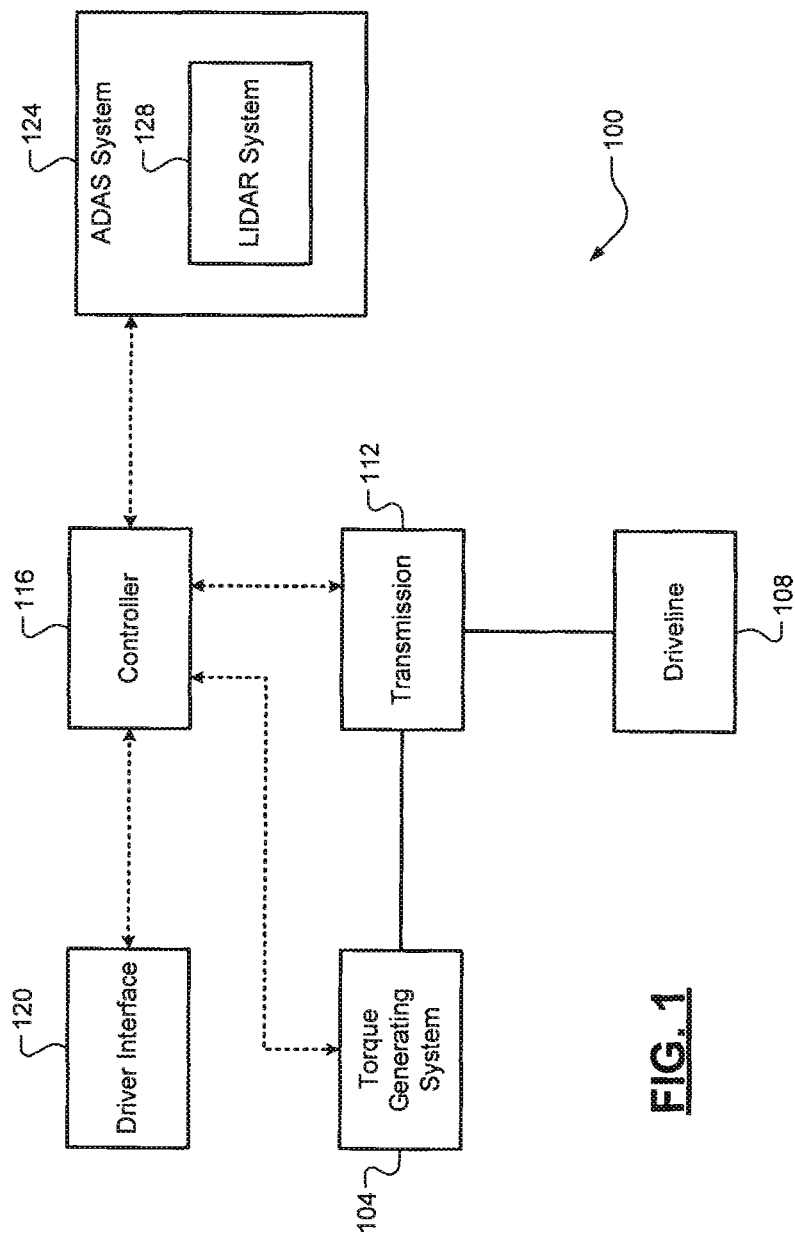
FIG. 1 is a functional block diagram of an example vehicle having an advanced driver assistance system (ADAS) with a light detection and ranging (LIDAR) system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a LIDAR system 128. While the ADAS 124 is illustrated as being separate from the controller 116, it will be appreciated that the ADAS 124 could be incorporated as part of the controller 116, or the ADAS 124 could have its own separate controller. The LIDAR system 128 emits laser light pulses and captures reflected laser light pulses (from other vehicles, structures, traffic signs, etc.) that collectively form captured 3D LIDAR point cloud data.

Figure 2:
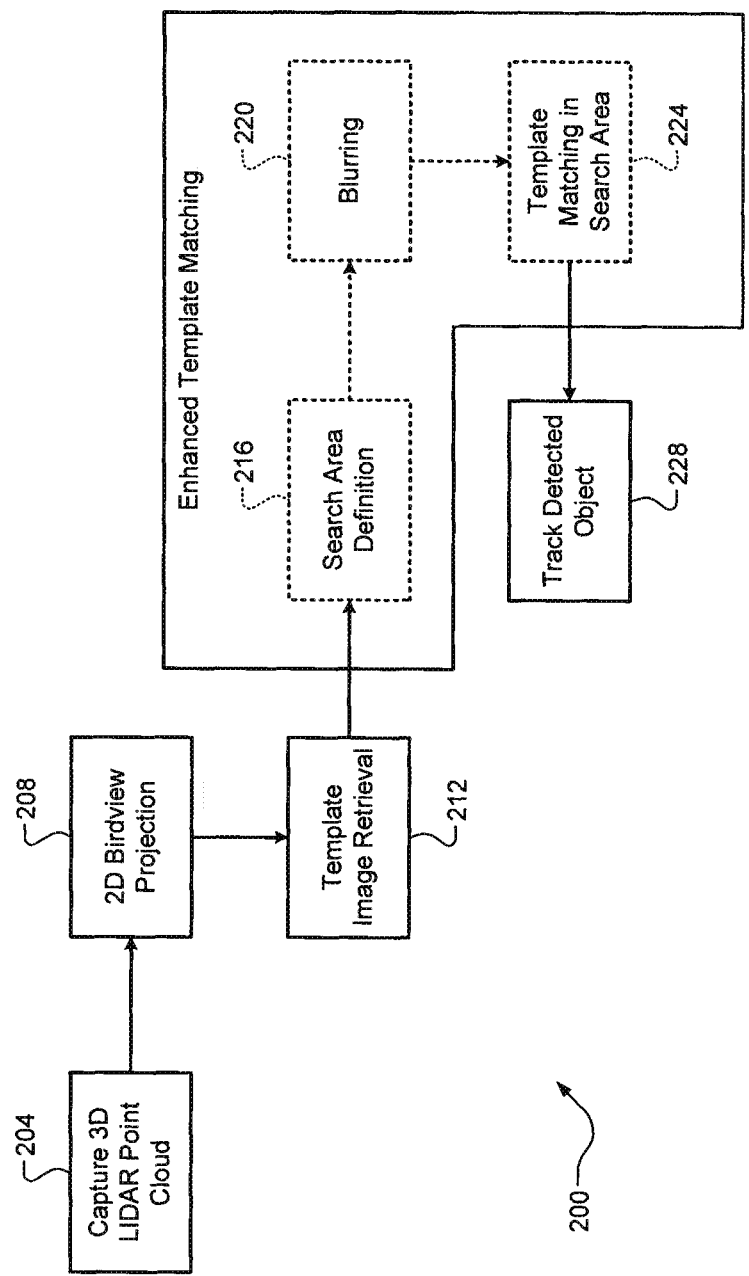
FIG. 2 is a functional block diagram of an example object detection architecture according to some implementations of the present disclosure.

Referring now to FIG. 2, a functional block diagram of an example traffic sign detection architecture 200 is illustrated. It will be appreciated that this architecture 200 could be implemented by the ADAS 124 or the controller 116. At 204, the 3D LIDAR point cloud data is captured using the LIDAR system 128. This could include, for example, analyzing return times and wavelengths of the reflected laser light pulses. At 208, the 3D LIDAR point cloud data is converted to a 2D birdview image. This could include, for example only, projecting the 3D LIDAR point cloud data onto a ground plane. In other words, the x-y coordinates could be sliced or divided into vertical bins. The resulting 2D birdview image could be either binary (e.g., 0's and 1's) or grayscale (e.g., values between 0 and 1, inclusive). It will be appreciated that any suitable 3D point cloud to 2D birdview or perspective projection conversion technique could be utilized. At 212, a template image (e.g., a 2D birdview projection of a 3D LIDAR point cloud template) of a particular object (a vehicle, a pedestrian, a traffic sign, etc.) is obtained, such as via retrieval by the controller 116 from its memory.

At 216, the enhanced template matching techniques of the present disclosure begin. At 216, a search area is identified. More specifically, a sub-portion of the 2D birdview projection is identified for searching. Large portions of the 2D birdview projection, for example, may have no point cloud data (i.e., white space). The search area could also be identified based on vehicle operating parameters, such as vehicle speed/direction. At 220, both the 2D birdview projection (e.g., its identified sub-portion) and the template image are blurred. This blurring could be achieved by applying an averaging filter. Non-limiting examples of this averaging filter include a moving average filter and, specific to image processing, an image box blur filter. It will be appreciated, however, that any suitable blurring filter could be applied. At 224, matching is performed. More specifically, the blurred template image is attempted to be matched to a portion of the blurred 2D birdview projection. At 228, when a match is found, the object corresponding to the template image is detected and tracked.

Figure 3A:
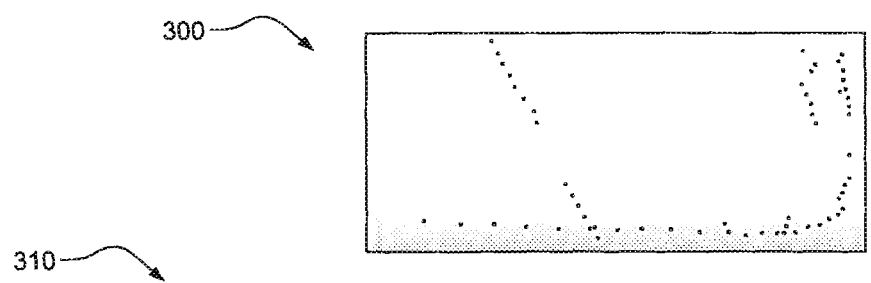
Figure 3B:
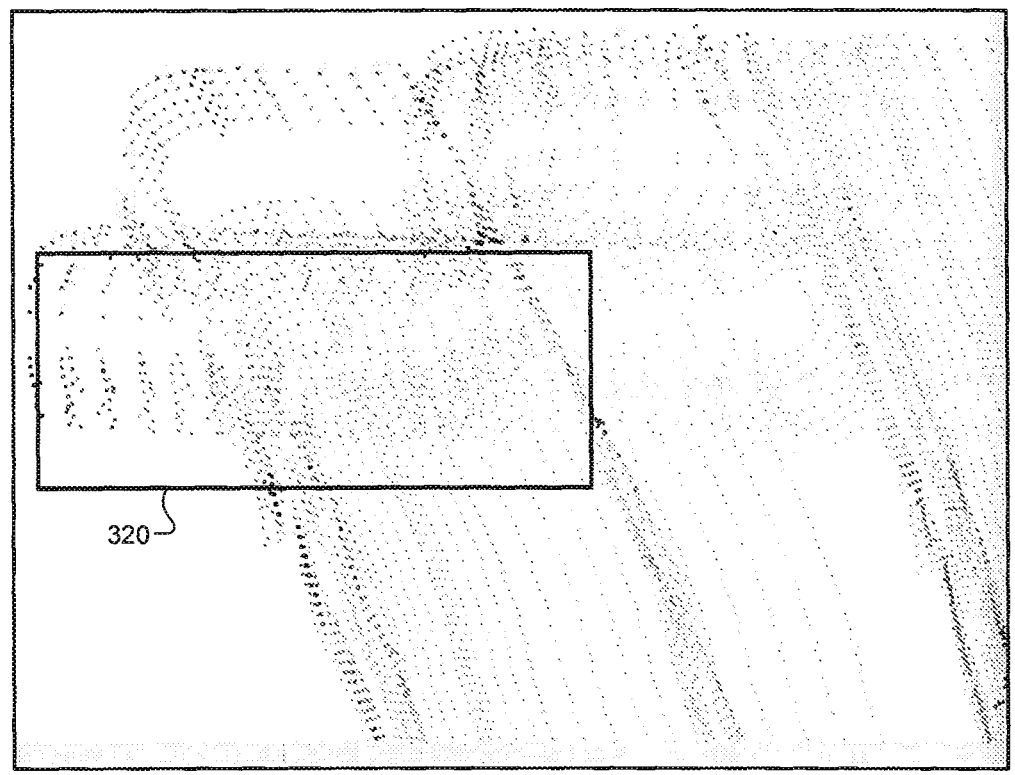
Figure 3C:
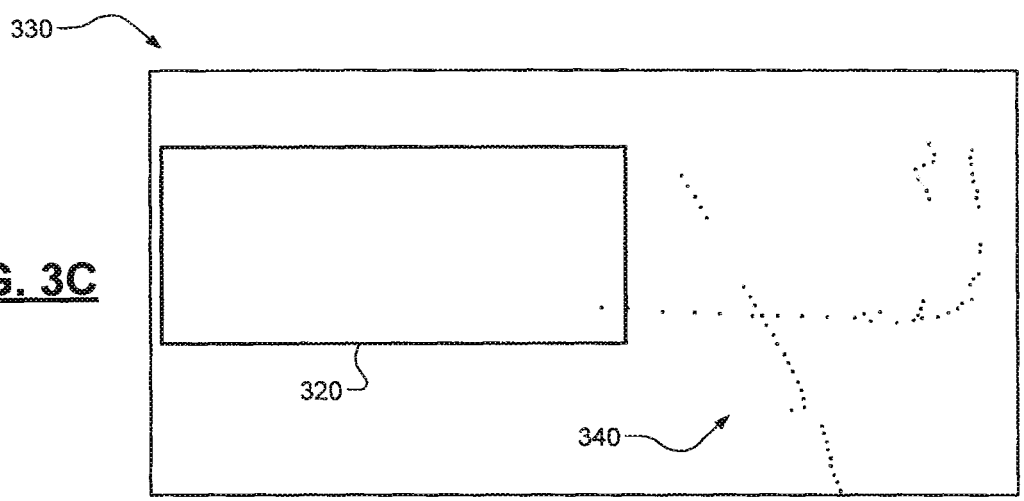

Referring now to FIGS. 3A-3C, an example of conventional unblurred template matching is illustrated. In FIG. 3A, an example template image 300 for a vehicle is illustrated. This template image 300 represents a 2D birdview projection of 3D LIDAR point cloud data (e.g., for a known vehicle). As can be seen, the general shape of a vehicle in a 2D birdview projection of 3D LIDAR point cloud data is a U-shape. It will be appreciated that the shape for a vehicle could also be an L-shape, which is one of the reasons why conventional template matching is difficult (i.e., L-shaped data may not match to a U-shaped template, and vice-versa). In FIG. 3B, an example 2D birdview projection 310 is illustrated. As can be seen, the pixels in both the template image 300 and the 2D birdview projection are very fine/distinct (i.e., high resolution). In FIG. 3C, a filtered or simplified view 330 of the 2D birdview projection 310 is illustrated, which shows an incorrectly detected object 320 (also shown in FIG. 3B). The actual object that should have been detected, however, is shown at 340.

Referring now to FIGS. 3D-3F, an example of enhanced blurred template matching according to the techniques of the present disclosure is illustrated. In FIG. 3D, an example blurred template image 350 is illustrated. This blurred template image 350 is a blurred version of template image 300 of FIG. 3A. As can be seen, the pixels appear larger due to the averaging (e.g., of multiple neighboring pixels). This blurring softens the features of the template shape (U-shape, L-shape, etc.), thereby providing for improved object detectability. In FIG. 3E, an example blurred 2D birdview projection 360 is illustrated. This blurred 2D birdview projection 360 is a blurred version of the 2D birdview projection of FIG. 3B. Again, as can be seen in FIG. 3E, the pixels in the blurred 2D birdview projection are less fine/distinct (i.e., low resolution). In FIG. 3F, a filtered or simplified view 370 of the blurred 2D birdview projection 360 is illustrated, which shows a correctly detected object 370 (also shown in FIG. 3E). Thus, the blurring enhances the ability for the system to match the template/actual images.

Figure 4:
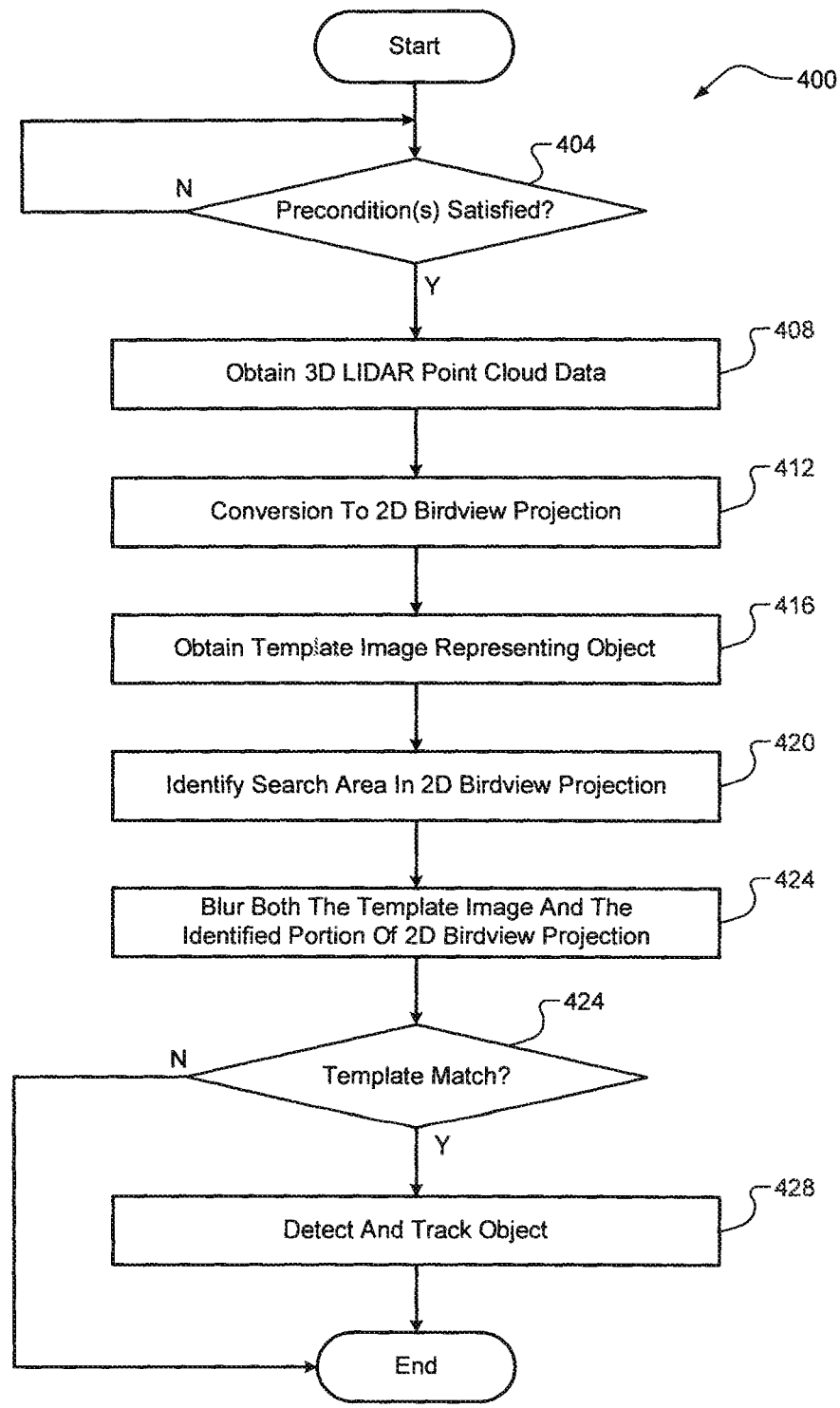
FIG. 4 is a flow diagram of an example method of object detection and tracking with enhanced template matching according to some implementations of the present disclosure.

Referring now to FIG. 4, a flow diagram of a traffic sign detection method 400 is illustrated. At 404, the controller 116 optionally determines whether a set of one or more preconditions are satisfied. These could include, for example only, the vehicle 100 being operated (e.g., the torque generating system 104 being activated) and no malfunctions being present. At 408, the controller 116 obtains the 3D LIDAR point cloud data using the LIDAR system 128. At 412, the controller 116 converts the 3D LIDAR point cloud data to a 2D birdview projection (e.g., by projection onto a ground plane). At 416, the controller 116 obtains a template image representing an object (a vehicle, a pedestrian, a traffic sign, etc.). For example, the controller 116 could retrieve the template image from its memory. At 420, the controller 116 optionally identifies a search area (a sub-portion) of the 2D birdview projection. It will be appreciated that the controller 116 could also search the entire 2D birdview projection, although this could increase processing time/resources.

At 424, the controller 116 blues both the template image and the 2D birdview projection (or it's sub-portion). At 428, the controller 116 performs template matching by attempting to match the blurred template image to a portion of the blurred 2D birdview projection. This matching could include, for example, determining a percentage of pixels that match between the blurred template image and the portion of the blurred 2D birdview projection. This percentage could then be compared to a threshold (e.g., 90 or 95%) and, when the threshold is satisfied, a match is detected. When a match is detected, the method 400 proceeds to 428. Otherwise, the method 400 ends or returns to 416 to obtain a different template image and then repeat the process. At 428, the controller 116 detects and tracks the object. This could include, for example, controlling an RDAS function, such as, but not limited to, collision avoidance, active cruise control (ACC), and the like. The method 400 then ends.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The controller could also include a memory as described above for storing template images. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
    a light detection and ranging (LIDAR) system configured to emit laser light pulses and capture reflected laser light pulses collectively forming three-dimensional (3D) LIDAR point cloud data; and
    a controller configured to:
        receive the 3D LIDAR point cloud data;
        convert the 3D LIDAR point cloud data to a two-dimensional (2D) birdview projection;
        obtain a template image for object detection, the template image being representative of a specific object;
        blur the 2D birdview projection and the template image to obtain a blurred 2D birdview projection and a blurred template image; and
        detect the specific object by matching a portion of the blurred 2D birdview projection and the blurred template image.

2. The ADAS of claim 1, wherein the controller is configured to blur the 2D birdview projection and the template image by applying an averaging filter.

3. The ADAS of claim 2, wherein the blurred 2D birdview projection and the blurred template image each have less resolution than the corresponding 2D birdview projection and template image.

4. The ADAS of claim 2, wherein the averaging filter is a moving average filter.

5. The ADAS of claim 2, wherein the averaging filter is an image box blur filter.

6. The ADAS of claim 1, wherein the controller is further configured to identify a search area in the 2D birdview projection that corresponds to the portion of the blurred 2D birdview projection used for matching.

7. The ADAS of claim 1, wherein the template image is a 2D birdview projection of 3D LIDAR point cloud template data, and wherein the controller is further configured to retrieve the template image from a memory.

8. The ADAS of claim 1, wherein the controller is further configured to track the detected object and control an ADAS function of the vehicle based on the tracking.

9. The ADAS of claim 1, wherein the controller does not utilize a deep neural network (DNN) and machine learning.

10. An object detection and tracking method for a vehicle, the method comprising:
    receiving, by a controller of the vehicle and from a light detection and ranging (LIDAR) system of, the vehicle, three-dimensional (3D) LIDAR point cloud data indicative of reflected laser light pulses captured by the LIDAR system after emitting of laser light pulses by the LIDAR system;
    converting, by the controller, the 3D LIDAR point cloud data to a two-dimensional (2D) birdview projection;
    obtaining, by the controller, a template image for object detection, the template image being representative of an object;
    blurring, by the controller, the 2D birdview projection and the template image to obtain a blurred 2D birdview projection and a blurred template image; and
    detecting, by the controller, the object by matching a portion of the blurred 2D birdview projection and the blurred template image.

11. The method of claim 10, wherein the blurring of the 2D birdview projection and the template image comprises applying an averaging filter.

12. The method of claim 11, wherein the blurred 2D birdview projection and the blurred template image each have less resolution than the corresponding 2D birdview projection and template image.

13. The method of claim 11, wherein the averaging filter is a moving average filter.

14. The method of claim 11, wherein the averaging filter is an image box blur filter.

15. The method of claim 10, further comprising identifying, by the controller, a search area in the 2D birdview projection that corresponds to the portion of the blurred 2D birdview projection used for matching.

16. The method of claim 10, wherein the template image is a 2D birdview projection of 3D LIDAR point cloud template data, and further comprising retrieving, by the controller and from a memory, the template image.

17. The method of claim 10, further comprising tracking, by the controller, the detected object and controlling, by the controller, an ADAS function of the vehicle based on the tracking.

18. The method of claim 10, wherein the controller does not utilize a deep neural network (DNN) and machine learning.

* * * * *